US008422330B2

(12) United States Patent
Hatano et al.

(10) Patent No.: US 8,422,330 B2
(45) Date of Patent: Apr. 16, 2013

(54) MEMORY CONTROLLER AND MEMORY CONTROLLING METHOD

(75) Inventors: Hiroshi Hatano, Kanagawa (JP); Takashi Nishikawa, Kanagawa (JP); Masahiko Toichi, Kawasaki (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 21 days.

(21) Appl. No.: 13/242,990

(22) Filed: Sep. 23, 2011

(65) Prior Publication Data

US 2012/0163113 A1 Jun. 28, 2012

(30) Foreign Application Priority Data

Dec. 24, 2010 (JP) ................................ 2010-288176

(51) Int. Cl.
*G11C 8/08* (2006.01)

(52) U.S. Cl.
USPC ................................ 365/230.03; 365/230.06

(58) Field of Classification Search ............ 365/230.03, 365/230.06
See application file for complete search history.

(56) References Cited

U.S. PATENT DOCUMENTS

| | | | | | |
|---|---|---|---|---|---|
| 4,651,274 | A * | 3/1987 | Omoda et al. | ..................... | 712/8 |
| 4,967,350 | A * | 10/1990 | Maeda et al. | ..................... | 712/8 |
| 7,937,559 | B1 * | 5/2011 | Parameswar et al. | ........... | 712/37 |
| 2003/0009502 | A1 * | 1/2003 | Katayanagi | .................. | 708/622 |

* cited by examiner

*Primary Examiner* — Michael Tran
(74) *Attorney, Agent, or Firm* — Staas & Halsey LLP

(57) ABSTRACT

A memory controller includes: a first generating unit that generates a read-address to read a data element sequence having a plurality of data elements from a bank of a memory; a second generating unit that generates a position signal indicating a position of a data element to be selected from the data element sequence, and an order signal indicating a storing order for storing the data element to be selected into a register; and a selector unit that selects, according to the position signal, the data element to be selected from the data element sequence read out from each of the plurality of the banks, and stores the selected data element in the storing order indicated by the order signal into the register, wherein the data element stored in the register is processed in the storing order by a vector processor.

9 Claims, 12 Drawing Sheets

BANK 6_4
BANK 6_3
BANK 6_2
BANK 6_1
R1
R2
R3
R4
0x0
0x40
0x80
0xA0
0x30
0x60
0x50
0x40

READ-ADDRESS rADD
PS
BANK ENABLE SIGNAL BE
ELEMENT ENABLE SIGNAL EE
BANK OFFSET SIGNAL BO

ELEMENT OFFSET SIGNAL EO
ORDER SIGNAL S6
POSITION SIGNAL S4
DATA ELEMENT SEQUENCE R1-R4

8
PROCESSING ORDER
DATA ELEMENTS

BANK 6_4
BANK 6_3
BANK 6_2
BANK 6_1
R4
R3
R2
0x0
0x40
0x80
0xA0
0x70
0x60
0x90

READ-ADDRESS rADD
PS
BANK ENABLE SIGNAL BE
ELEMENT ENABLE SIGNAL EE
BANK OFFSET SIGNAL BO

ELEMENT OFFSET SIGNAL EO
ORDER SIGNAL S6
POSITION SIGNAL S4
DATA ELEMENT SEQUENCE R1-R4

PROCESSING ORDER
DATA ELEMENTS
8

WRITE-ADDRESS wADD
BANK ENABLE SIGNAL BE
ELEMENT ENABLE SIGNAL EE
BANK OFFSET SIGNAL BO
PS

ELEMENT OFFSET SIGNAL EO
ORDER SIGNAL S5
POSITION SIGNAL S7
BANK 6_4
BANK 6_3
BANK 6_2
BANK 6_1
0x70
0x60
0x90

VECTOR REGISTER STORING ORDER
COMPUTATION DATA ELEMENT
DATA MASK SIGNAL DM

DATA ELEMENT SEQUENCE R1-R4
DATA MASK SIGNAL DM2

ADDRESS LOCATION
0x0
0x40
0x80
0xA0
R4
R3
R2

MEMORY CONTROLLER AND MEMORY CONTROLLING METHOD

CROSS-REFERENCE TO RELATED APPLICATION

This application is based upon and claims the benefit of priority of the prior Japanese Patent Application No. 2010-288176, filed on Dec. 24, 2010, the entire contents of which are incorporated herein by reference.

FIELD

Embodiments discussed herein relate to a memory controller which controls reading data from and/or writing data into a memory, and a method for controlling a memory.

BACKGROUND

A vector processor is used for a vector process in which a certain computation is performed in a repetition to a large amount of data in arrays (for example, U.S. Pat. No. 5,809,552). By the vector processor, data elements in an array are consecutively processed under one instruction, and a high computation throughput is obtained. The vector processor has, for example, load/store and computation pipelines. The load/store pipeline reads data elements from a data memory, and stores the data elements in a register (referred to as a vector register, hereinafter) in a processing order of the computation pipeline. The computation pipeline, fetching and decoding a computation instruction for one time, reads data elements consecutively in a sequence from the vector register, and performs an arithmetic computation or the like. Then, the computation pipeline stores the data elements indicating the computation results into the vector register in the processing order. Then, the load/store pipeline reads the data elements indicating the computation results from the register, and stores the data elements in the data memory in the processing order.

There is a case that, for example, in a large-capacity data memory such as a DRAM (Dynamic Random Access Memory), data elements for input are stored at discontinuous addresses. Or, there is a case that the data elements indicating computation results will be stored at discontinuous addresses of the data memory. When the load/store pipeline reads the data elements from the data memory into the vector register, and/or writes the data elements from the vector register into the data memory, there occur accesses to a wide range of the memory area. This increases latency, which can be a factor to strangle the throughput. Also, for example, in pipelining with a high-speed cache memory such as SRAM (Static Random Access Memory) between the data memory and the vector register so as to decrease the latency, there is a concern for an increasing circuit scale and a high production cost.

SUMMARY

A memory controller in accordance with an embodiment includes: a first generating unit that generates a read-address to read a data element sequence having a plurality of data elements from a bank of a memory, the memory having a plurality of the banks, from each of which the data element sequence is read out in response to an input of the read-address; a second generating unit that generates a position signal indicating a position of a data element to be selected from the data element sequence, and an order signal indicating a storing order for storing the data element to be selected into a register; and a selector unit that selects, according to the position signal, the data element to be selected from the data element sequence read out from each of the plurality of the banks, and stores the selected data element in the storing order indicated by the order signal into the register, wherein the data element stored in the register is processed in the storing order by a vector processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
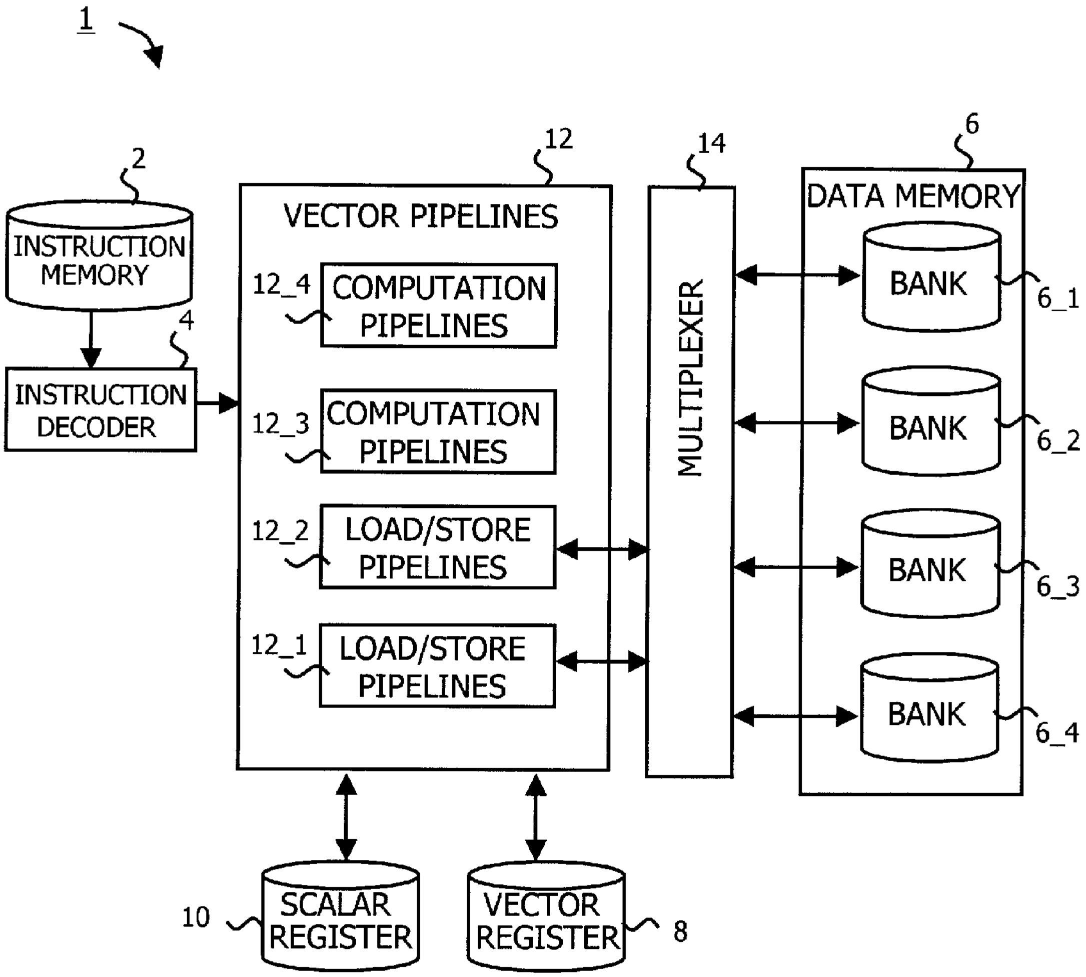
FIG. 1 is a drawing for depicting a configuration of a vector processor in accordance with an embodiment.

FIG. 1 is a drawing for depicting the configuration of a vector processor in accordance with the present embodiment.

At a vector processor 1, according to instructions stored in an instruction memory 2, vector pipelines 12 read out data elements stored in a data memory 6 and perform computations, and write the data elements indicating the computation results into the data memory 6. The vector processor 1 includes the instruction memory 2, the vector pipeline 12, and the data memory 6, and includes, in addition thereto, a vector register 8, a scalar register 10, a multiplexer 14, and an instruction decoder 4. The vector processor 1 includes, for example, a signal processing LSI (Large Scale Integrated circuit).

The instruction memory 2 stores control instructions and computation instructions for the vector pipeline 12. The instruction memory 2 includes, for example, an SRAM. The instruction decoder 4, reading instructions from the instruction memory 2, decodes the instructions and inputs them into the vector pipelines 12.

The vector pipelines 12 include load/store pipelines 12_1 and 12_2 for load/store processes and computation pipelines 12_3 and 12_4 for various kinds of computations. The load/store pipelines 12_1 and 12_2, and the computation pipelines 12_3 and 12_4 operate according to the control instructions and the computation instructions that are input. The load/store pipelines 12_1 and 12_2 access the data memory 6, and transfer data elements between the data memory 6 and the vector register 8. At this time, the load/store pipelines 12_1 and 12_2, by controlling the multiplexer 14, make selections of the transferred data elements. The computation pipelines 12_3 and 12_4 read out the data elements stored in the vector register 8, and execute computations, for example, arithmetic computations such as addition, subtraction, and multiplication, or a logic computation. Each of the computation pipelines 12_3 and 12_4 has, for example, one or more computing units. A computing unit included in the computation pipelines 12_3 and 12_4 executes, per one instruction, consecutive computations to the data elements in arrays.

The data memory 6 stores data elements in arrays. The data memory 6 includes, for example, an SRAM. The data elements include data for the computations by the computation pipelines 12_3 and 12_4. Also, the data elements include data indicating the computation results by the computation pipelines 12_3 and 12_4. The data memory 6 includes a plurality of banks 6_1, 6_2, 6_3, and 6_4. Each of the banks 6_1 through 6_4 has an access port for reading and/or writing data. Addresses of the banks 6_1 through 6_4 are accessed by interleaving.

The vector register 8 stores the data elements, which have been read out from the data memory 6 and will be input into the computation pipelines 12_3 and 12_4. Also, the vector register 8 stores the data elements, which have been output from the computation pipelines 12_3 and 12_4 and will be written into the data memory 6. Additionally, in the scalar register 8, various kinds of data, other than the data for the vector process, to be input to and/or output from the vector pipeline 12 are stored.

Figure 2A:
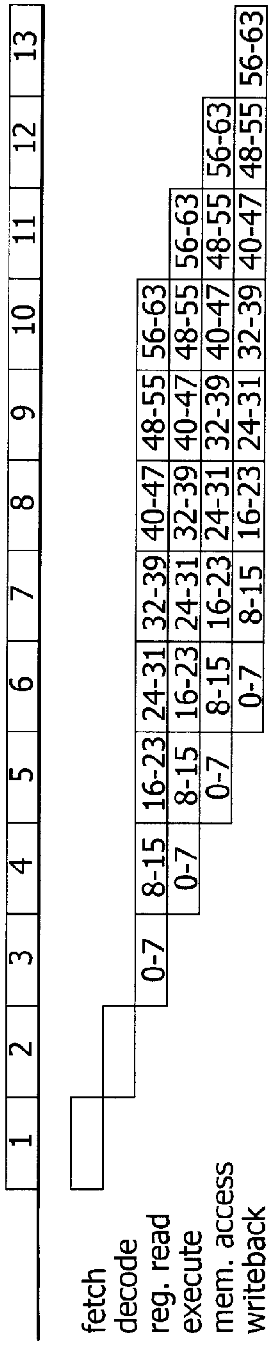
FIGS. 2A and 2B are drawings for depicting processing sequence of vector pipelines.
Figure 2B:
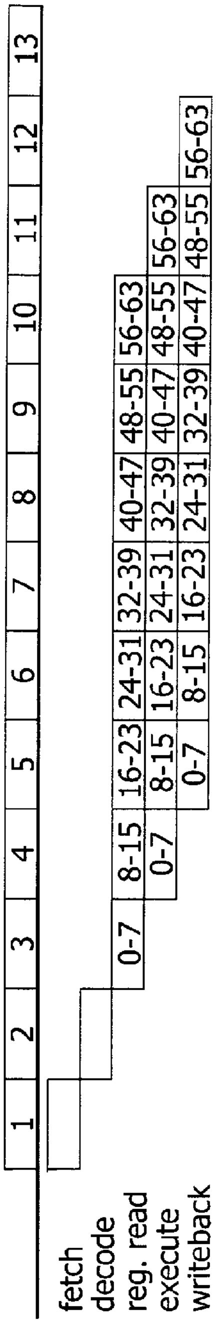

FIGS. 2A and 2B are drawings for depicting process sequences of the vector pipelines 12_1 through 12_4. In FIG. 2A, the process sequence of the load/store pipelines 12_1 and 12_2 are depicted. In FIG. 2B, the process sequences of the computation pipelines 12_3 and 12_4 are depicted. In FIGS. 2A and 2B, the vertical axes represent processing stages, and the lateral axes represent the time (process cycle). Here, an example is depicted such that 64 data elements are processed consecutively in series. The numbers within cells each represent array numbers, from 0 to 63, of the data elements to be processed.

As depicted in FIG. 2A, the load/store pipelines 12_1 and 12_2 execute in series and in parallel 6 stages of an instruction, such as "fetch" and "decode" of the instruction, "reg.read" to read out the instruction from the register, "execute" to execute the instruction, "mem.access" to access the memory, and "writeback" to write the execution result to the register. Each stage is executed in one process cycle. At this time, "fetch" and "decode" are executed for one time. Then at each stage from "execute" through "writeback", 8 data elements are processed in series in one process cycle.

By the pipeline-process as above, 6-stage process to 64 data elements are executed in 13 process cycles.

As depicted in FIG. 2B, the computation pipelines 12_3 and 12_4 execute in series and in parallel 5 stages of an instruction, such as "fetch", "decode", "reg.read", "execute", and "writeback". At this time, "fetch" and "decode" are executed for one time. Then, at each stage from "execute" through "writeback", 8 data elements are consecutively processed in one process cycle. By the pipeline-process as above, 5-stage process to 64 data elements are executed in 12 process cycles.

Figure 3A:
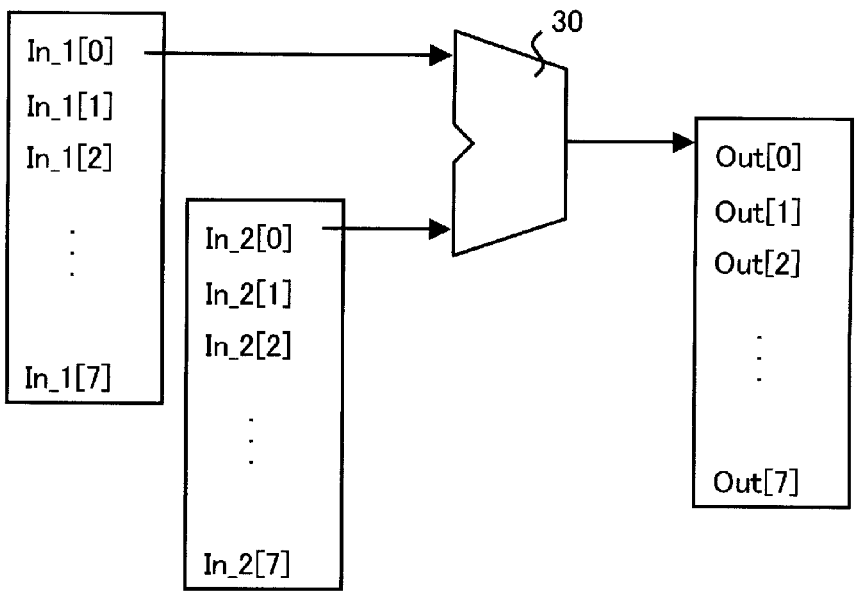
FIGS. 3A and 3B are drawings for depicting operations of computation pipelines.
Figure 3B:
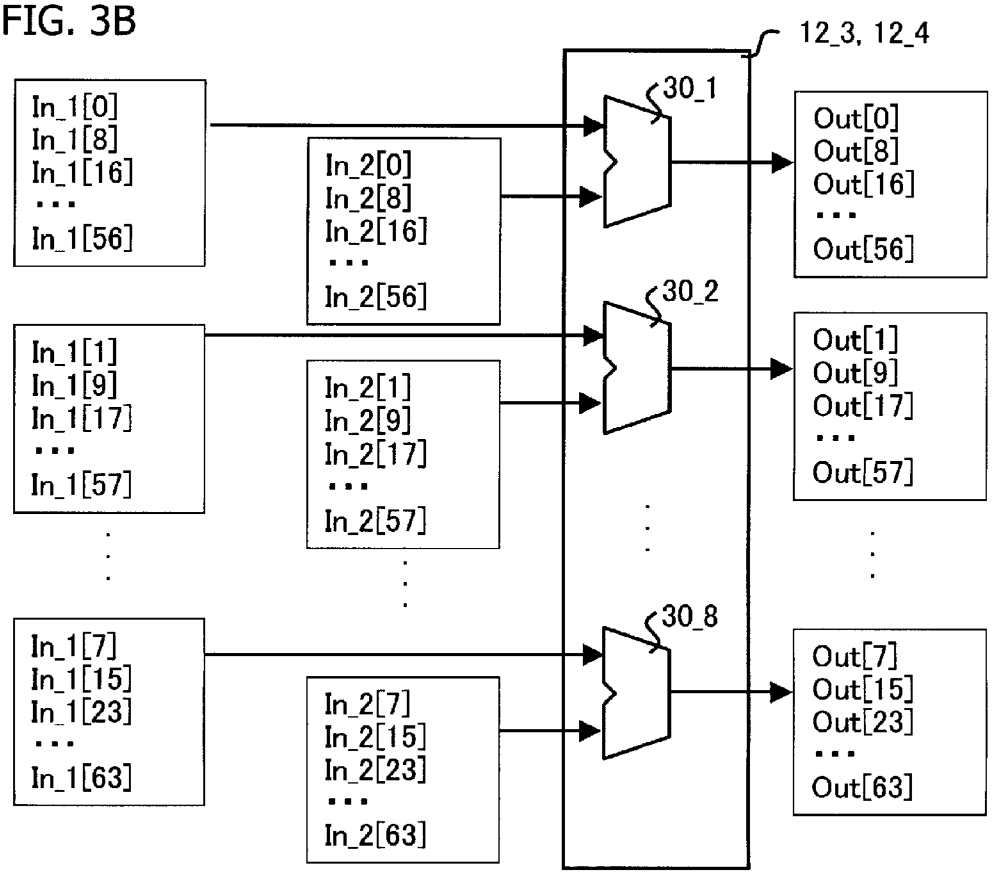

FIGS. 3A and 3B are drawings for depicting operations of the computation pipelines 12_3 and 12_4 at the "execute" stage of an instruction. In FIG. 3A, an example is depicted such that the computation pipelines 12_3 and 12_4 each have, for example, a single computing unit 30. The computing unit 30 is, for example, a 16-bit computing unit. Here, an example is depicted such that the computing unit 30 processes 8 pairs of the data elements in the order of the array numbers. Each data element has, for example, 16-bit data length. The computing unit 30 processes 8 pairs of the data elements in one process cycle. The computing unit 30 performs arithmetic computations of the data elements In_1[i] and In_2[i], where i is the array number, in the order of the array number i consecutively, for example, from i=0 through i=7. Then, the data elements Out[i] indicating the computation results are output.

In FIG. 3B, an example is depicted such that the computation pipelines 12_3 and 12_4 each have, for example, 8 computing units 30_1 through 30_8. Each of the computing units 30_1 through 30_8 is, for example, a 16-bit computing unit. Here, an example is depicted such that the computing units 30_1 to 30_8 process in parallel 8 pairs of 16-bit length data elements. The computing unit 30_1 to 30_8 perform computations of the data elements In_1[i] and In_2[i] for the array numbers i=0 through 7, for example, at the time of the first computation. Then, data elements Out[i] indicating the computation results are output. Then, at the time of the second computation, the computing units 30_1 through 30_8 each process the data elements for the array numbers i=8 through 15, in the similar manner. Then, at the time of the third computation, the computing units 30_1 through 30_8 each process the data elements for the array numbers i=16 through 23, in the similar manner. As such, at each execution of the computation, 8 data elements are processed. Then, at the time of the eighth computation, the computing units 30_1 through 8 processes the data elements for the array numbers i=56 through 63, in the similar manner. As such, the computing units 30_1 through 8 execute a cycle of computation to 8 pairs of the data elements for 8 consecutive times, thus 64 pairs of the data elements being processed.

As above, the computation pipelines 12_3 and 12_4 perform the fetch and the decode of a computation instruction at one time, and process the data elements consecutively in series. Thereby, time for the fetch and the decode of an instruction is reduced and high throughput is obtained. Also, the computation pipelines 12_3 and 12_4, by having the plurality of the computing units, and by parallel operations thereof, enable a high throughput.

Figures 4A, 4B, 4C:
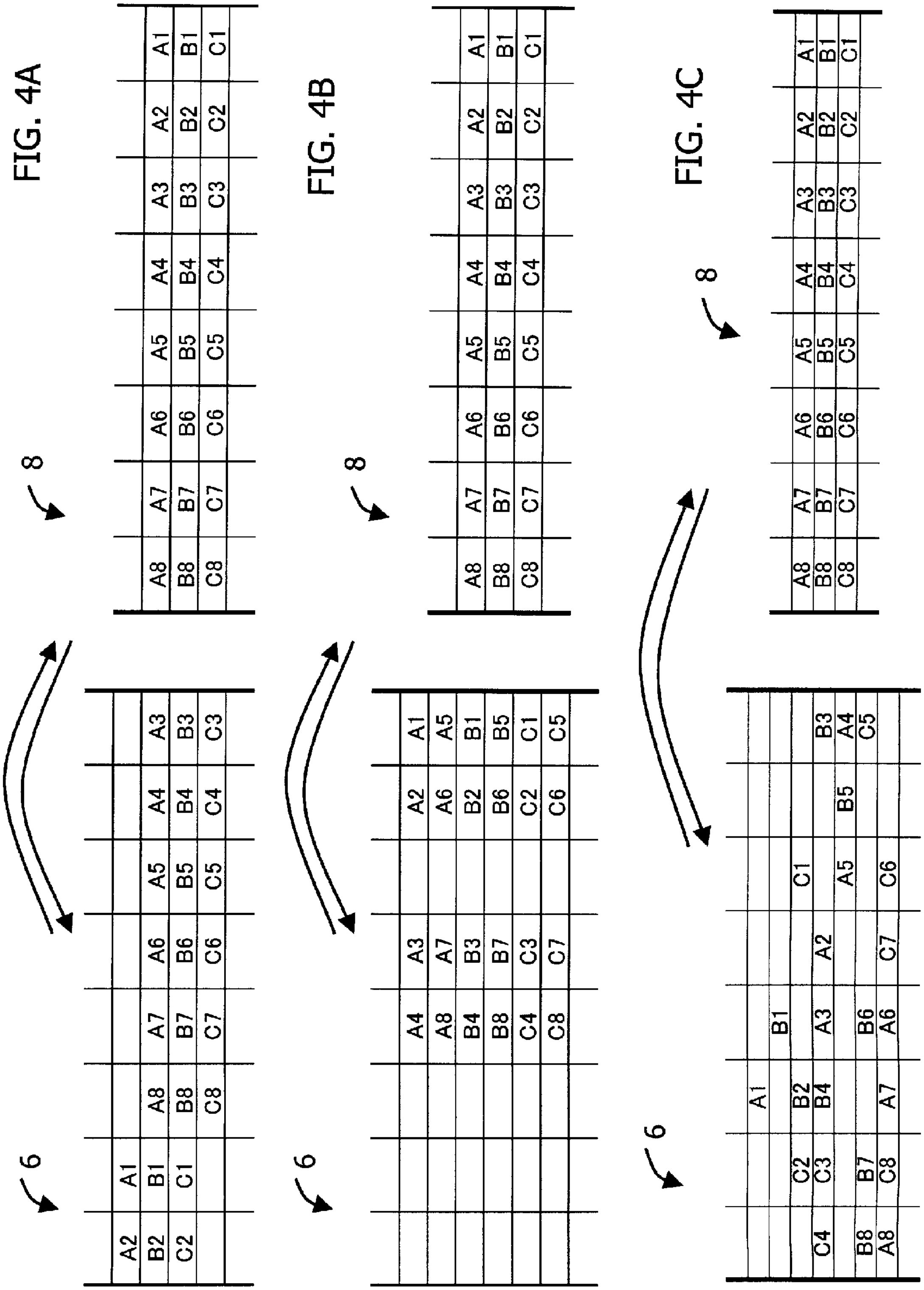
FIGS. 4A through 4C are drawings for schematically depicting transfers of data elements.

On the other hand, the load/store pipelines 12_1 and 12_2 transfer the data elements between the data memory 6 and the vector register 8. FIGS. 4A to 4C are drawings for schematically depicting the transfers of the data elements. In FIGS. 4A through 4C, cells of the data memory 6 and the vector register 8 each represent an address for storing one piece of data elements. Also, codes in the cells each represent a data element.

In FIG. 4A, an example is depicted such that the data elements are read out from and/or written to consecutive addresses of the data memory 6. Such a case is referred to as "sequential access". In the sequential access, the load/store pipelines 12_1 and 12_2 read out, for example, data elements "A1" through "A8", and "B1" through "B8" from the consecutive addresses of the data memory 6, and stores the data elements in the vector register 8 in the processing order of the computation pipelines 12_3 and 12_4. Also, the load/store pipelines 12_1 and 12_2 read out the data elements "C1" through "C8" from the vector register 8 and writes the data elements into the consecutive addresses of the data memory 6.

In FIG. 4B, an example is depicted such that the data elements are read out from and/or written to discrete addresses of the data memory 6. Such a case is referred to as a "stride access". The stride access is performed, for example, when the data elements arranged with a certain interval are subtracted and processed. For example, applicable case is processing the data elements of even array numbers, or processing the data elements of the array numbers at a certain interval. In the stride access, the load/store pipelines 12_1 and 12_2 read, for example, the data elements "A1" through "A8" and "B1" through "B8" from discrete addresses of the data memory 6 into the vector register 8 in the processing order. Also, the load/store pipelines 12_1 and 12_2 read the data elements "C1" through "C8" from the vector register 8 and write the data elements into discrete addresses of the data memory 6.

In FIG. 4C, an example is depicted such that the data elements are read out from and/or written to scattered addresses at the data memory 6. Such a case is referred to as an "indirect access". The indirect access is performed, for example, when scattered data elements are processed. In the indirect access, the load/store pipelines 12_1 and 12_2 read out, for example, the data elements "A1" through "A8", and "B1" through "B8" from scattered addresses of the data memory 6, and store the data elements into the vector register 8 in the processing order. Also, the load/store pipelines 12_1 and 12_2 read the data elements "C1" through "C8" out from the vector register 8, and write the data elements into scattered addresses of the data memory 6.

In the above, in the order of the sequential access, the stride access, and the indirect access, the address range to be accessed becomes wider. Along with this, the number of accesses increases, thus the probability of memory latency increases. In the present embodiment, the memory latency is suppressed in the following manner, so as to achieve a preferable throughput.

Figure 5:
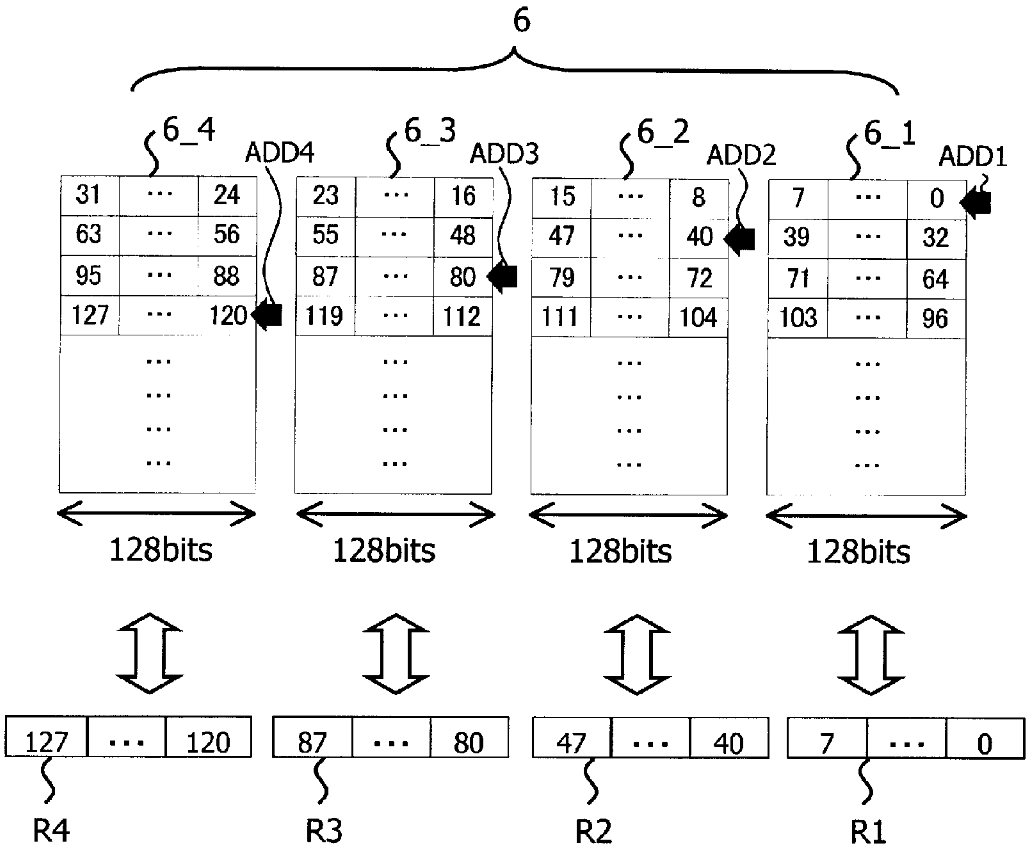
FIG. 5 is a drawing for depicting reading/writing of data elements of a data memory.

FIG. 5 is a drawing for depicting reading and writing the data elements at the data memory 6. The data memory 6 has a plurality of banks, for example, the banks 6_1 through 6_4, which are accessed by interleaving. The banks 6_1 through 6_4 each have, for example, the 128-bit bank width. Cells each represent a 16-bit length storage area, and numbers in the cells each indicate the data elements. As such, in one bank width, eight pieces of 16-bit length data elements are stored.

From each of the banks 6_1 through 6_4, in response to input of a read-address, for example, a data element sequence having 8 data elements is read. Or, to each of the banks 6_1 through 6_4, for example, a data element sequence having 8 data elements is written at a write-address. For example, at the bank 6_1, a data element sequence R1 having data elements "0" through "7" is read out from and/or written to the address ADD1 by one access. Also, at the bank 6_2, a data element sequence R2 having data elements "40" through "47" is read out from and/or written to the address ADD2 by one access. Also, at the bank 6_3, a data element sequence R3 having data elements "80" through "87" is read out from and/or written to the address ADD3 by one access. Then, at the bank 6_4, a data element sequence R4 having data elements "120" through "127" is read out from and/or written to the address ADD4 by one access. As above, the data memory 6 as a whole, the data element sequences R1 through R4 having 32 data elements are read out and/or written by one access.

Figure 6:
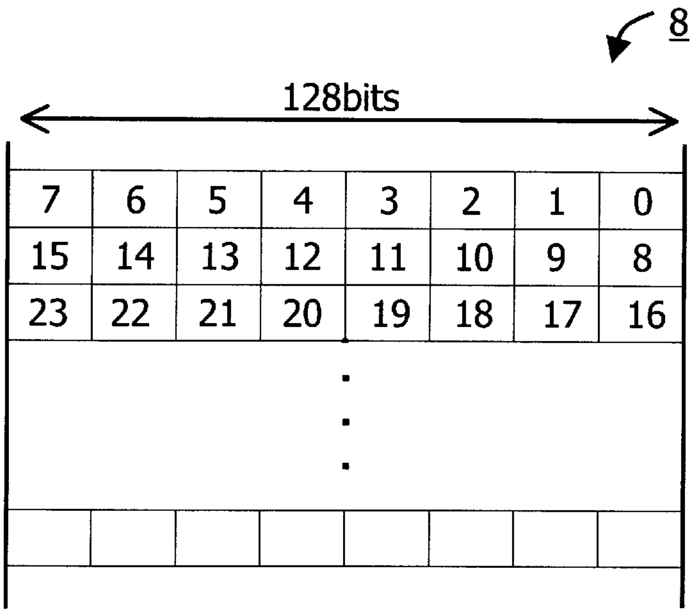
FIG. 6 is a drawing for depicting a vector register.

FIG. 6 is a drawing for depicting the vector register 8. At the vector register 8, the data elements for computations, or the data elements indicating the computation results are stored in a processing order of the computation pipelines 12_1 and 12_2. The vector register 8 has, for example, 128-bit width, and has 8 pieces of 16-bit length data elements stored at one row-address. Here, each cell represents a storage area of 16-bit length, and a number within the cell indicates the array numbers of the data elements stored therein.

For example, as depicted in FIG. 3A, when the computation pipelines 12_1 and 12_2 processes 8 pairs of the data elements by one computing unit in one process cycle, the data elements as described bellow are stored in the vector register 8. For example, at a pair of row-addresses, pairs of the data elements to be input in series into the computing unit are stored in the processing order, and at another row-address, the data elements indicating the computation results are stored in the processing order.

As above, at the banks 6_1 through 6_4 as a whole, the data element sequences R1 through R4, each of which includes 32 data elements, are read out and/or written by interleaving by one access. Thereby, latency is suppressed. On the other hand, in the vector register 8, 8 data elements for a computation or the data elements indicating the computation results are stored at one row-address. Hereinafter, the data elements stored in the vector register 8 are referred to as "computation data element", to differentiate from other data elements stored in the data memory 6). Accordingly, in accordance with the present embodiment, in the manner as described bellow, 8 computation data elements to be stored in the vector register 8 are selected from 32 data elements included in the data element sequences R1 through R4 read out from the banks 6_1 through 6_4. Also, 8 computation data elements stored in the vector register 8 are inserted into the data element sequences R1 through R4 to be written into the banks 6_1 through 6_4 by one access, thus being written into the data memory 6.

Below, with regard to the memory controller in accordance with the present embodiment, an explanations will be made for an example of the computation data elements being read out from the data memory 6 and stored into the vector register 8, and for an example of the computation data elements being read out from the vector register 8 and written into the data memory 6.

<Example of Computation Data Elements being Read Out from the Data Memory 6 and Stored into the Vector Register 8>

Figure 7:
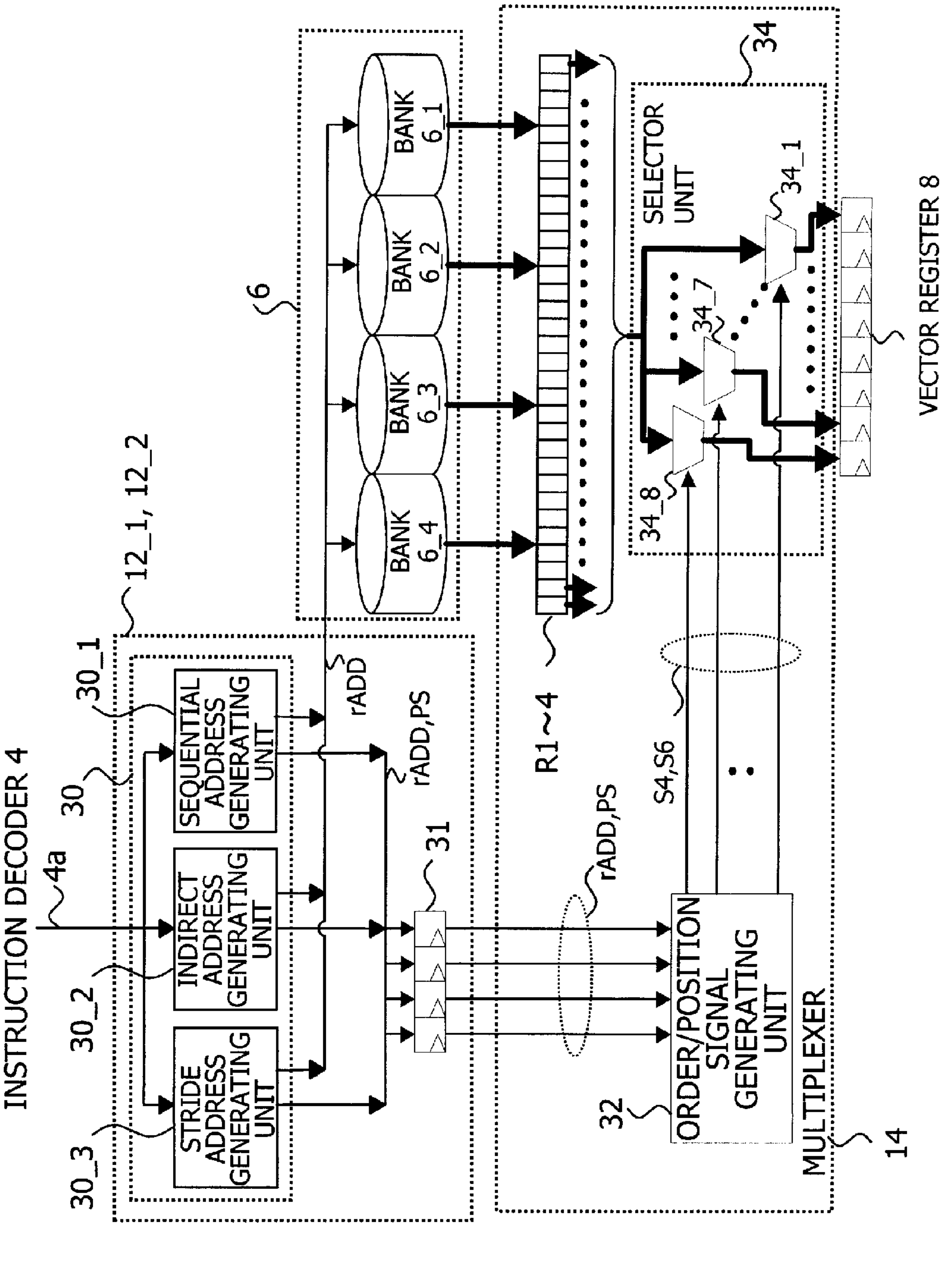
FIG. 7 is a drawing for depicting a configuration of a memory controller.

In FIG. 7, a configuration of the memory controller for reading computation data elements from the data memory 6 and storing the computation data elements into the vector register 8 is depicted. The memory controller has an address generating unit 30, which generates the read-address rADD of each of the banks 6_1 through 6_4 of the data memory 6 so as to read the data element sequences R1 through R4. The address generating unit 30 is, for example, a module within the load/store pipelines 12_1 and 12_2. The address generating unit 30 generates the read-address rADD on the basis of the address generating data 4*a* input from the instruction decoder 4. The address generating unit 30 has, for example, a sequential address generating unit 30_1 for generating read-addresses for the sequential access, an indirect address generating unit 30_2 for generating read-addresses for the indirect access, and a stride address generating unit 30_3 for generating read-addresses for the stride access. The read-address rADD for each of the banks 6_1 through 6_4, generated by the address generating unit 30, is input into each of the banks 6_1 through 6_4 of the data memory 6. On the other hand, at the address generating unit 30, for example, various kinds of processing signals PS are generated by the sequential address generating unit 30_1, the indirect address generating unit 30_2, and the stride address generating unit 30_3. Then, the read-address rADDs for the banks 6_1 through 6_4 and the various kinds of processing signals PS are stored into the register 31.

The memory controller has an order/position signal generating unit 32, which generates the position signal S4 indicating positions of the computation data elements at the data element sequences R1 through R4, and an order signal S6 indicating the storing order by which the computation data elements are stored in the register. The order/position signal generating unit 32 is, for example, a module within the multiplexer 14. The order/position signal generating unit 32 reads the read-address rADDs and the various kinds of processing signals PS stored in the register 31, and, on the basis thereof, generates the position signal S4 and the order signal S6. The detail will be explained below.

Also, the memory controller has a selector unit 34 which selects the computation data elements, according to the position signal S4, from among the data element sequences R1 through R4 read out from the plurality of the banks 6_1 through 6_4, and stores the selected computation data elements into the vector register 8 in the storing order indicated by the order signal S6. The selector unit 34 is, for example, included within the multiplexer 14. The selector unit 34 has, for example, selectors 34_1 through 34_8 for 8 storing positions at the vector register 8. To each of the selectors 34_1 through 34_8, 32 data elements of the data element sequences R1 through R4 are input. Then, the selectors 34_1 through 34_8 each select a computation data element from 32 data elements to store into a position which each selector corresponds to, according to the position signal S4 and the order signal S6, and store the selected computation data elements into the vector register 8.

Figures 8A, 8B, 8C, 8D:
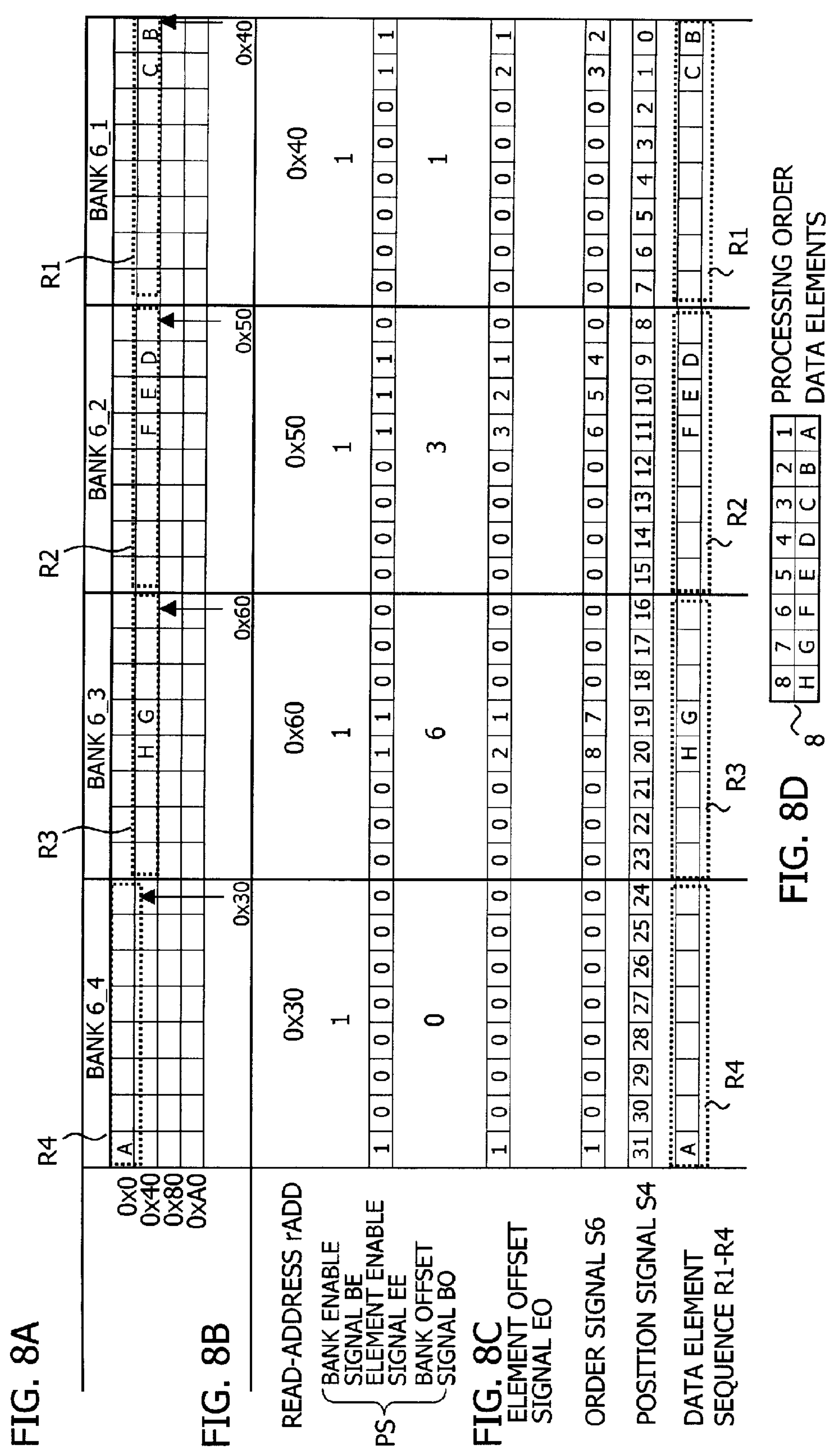
FIGS. 8A through 8D are drawings for depicting operation of an order/position signal generating unit.

FIG. 8 is a diagram for depicting detail operations of the order/position signal generating unit 32. Here, an example is depicted such that the computation data elements "A", "B", "C", "D", "E", "F", "G", and "H" are stored in that order into the vector register 8. In FIG. 8A, an example is depicted such that 8 computation data elements "A" through "H" are stored in scattered manner in the banks 6_1 through 6_4. Also, in FIG. 8A, the read-addresses for the data element sequences R1 through R4 including the computation data elements "A" through "H" are depicted. Here, the addresses increase from right to left, and top to bottom of the drawing. The order of the read-addresses of each of the banks 6_1 through 6_4 correspond to the storing order of the computation data elements "A" through "H" in the vector register 8, included in the data element sequences R1 through R4 which are to be read, in other words, the processing order by the computation pipelines 12_3 and 12_4. For example, as depicted in the order of the addresses, the data element sequence R4 including the computation data element "A" is stored in the bank 6_4 at the address "0x30". Also, in the bank 6_1, the data element sequence R1 including the computation data elements "B" and "C" are stored at the address "0x40". Also, in the bank 6_2, the data element sequence R2 including the computation data elements "D", "E", and "F" are stored at the address "0x50". Then, in the bank 6_3, the data element sequence R3 including the computation data elements "G" and "H" are stored at the address "0x60".

In FIG. 8B, the read-address rADDs of the banks 6_1 through 6_4 generated by the address generating unit 30 are depicted. For example, for the bank 6_1, the read-address "0x40" is generated. Also, for the bank 6_2, the read-address "0x50" is generated. Also, for the bank 6_3, the read-address "0x60" is generated. Then, for the bank 6_4, the read-address "0x30" is generated.

In FIG. 8B, various kinds of processing signals PS generated by the address generating unit 30 are depicted. The various kinds of processing signals PS include a bank enable signal BE, an element enable signal EE, and a bank offset signal BO. The bank enable signal BEs, the element enable signal EEs, and the bank offset signal BOs are generated on the basis of the read-address rADD.

The bank enable signal BE indicates the validity of the read-address rADD of each of the banks 6_1 through 6_4. The bank enable signal BE is, for example, a 1-bit signal. When the read-address rADD is generated, the bank enable signal BE has the value of "1" for indicating the validity. On the other hand, when the read-address rADD is not generated, the bank enable signal BE has the value of "0". Here, the read-address rADDs are generated for all of the banks 6_1 through 6_4. Accordingly, for all of the banks 6_1 through 6_4, the bank enable signal BEs of the value "1" indicating the validity of the read-address rADDs are generated.

The element enable signal EE indicates the positions of the computation data elements to be selected among the data element sequences R1 through R4. The data element sequences R1 through R4 each include 8 data elements. Accordingly, the element enable signal for each of the data element sequences R1 through R4 is, for example, an 8-bit signal. Here, for example, the computation data elements "B" and "C" are respectively included in the data element sequence R1 at the first and the second column, counted along the sequence from the right to the left of the drawing. Accordingly, the value of the element enable signal EE corresponding to the data element sequence R1 is, respectively from the first to the eighth column, "1, 1, 0, 0, 0, 0, 0, 0". Also, in the data element sequence R2, the computation data elements "D", "E", and "F" are included from the second to the fourth columns. Accordingly, the value of the element enable signal EE corresponding to the data element sequence R2 is, respectively from the first to the eighth column, "0, 1, 1, 1, 0, 0, 0, 0". Also, in the data element sequence R3, the computation data elements "G" and "H" are included at the fourth and the fifth column. Accordingly, the value of the element enable signal EE corresponding to the data element sequence R3 is, respectively from the first to the eighth column, "0, 0, 0, 1, 1, 0, 0, 0". And, in the data element sequence R4, the computation data element "A" is included in the eighth column. Accordingly, the value of the element enable signal EE corresponding to the data element sequence R4 is, respectively from the first to the eighth column, "0, 0, 0, 0, 0, 0, 0, 1".

The bank offset signal BO indicates the order of the banks 6_1 through 6_4 corresponding to the processing order of the computation data elements included in the data element sequences R1 through R4. The value of the bank offset signal BO is obtained, in the manner as described below, from the order of the read-address rADD of the banks 6_1 through 6_4 and the accumulated value of the element enable signal EE.

First, the order of the read-address rADDs of the banks 6_1 through 6_4, is in the ascending order, as follows.

<NUMBER 1> the read-address rADD ("0x30") of the bank 6_4

<NUMBER 2> the read-address rADD ("0x40") of the bank 6_1

<NUMBER 3> the read-address rADD ("0x50") of the bank 6_2

<NUMBER 4> the read-address rADD ("0x60") of the bank 6_3

Also, the accumulated value of the element enable signal EE of the each bank in the above order are as follows.

<NUMBER 1> the accumulated value of the element enable signal EE of the bank 6_4, “1”

<NUMBER 2> the accumulated value of the element enable signal EE of the bank 6_1, “2”

<NUMBER 3> the accumulated value of the element enable signal EE of the bank 6_2, “3”

<NUMBER 4> the accumulated value of the element enable signal EE of the bank 6_3, “2”

And the value of the bank offset signal BO of each bank is obtained as a sum of the value of the bank offset signal BO and the accumulated value of the value of the enable signal EE of the bank in the previous order. An example is described below.

<NUMBER 1> the bank offset signal BO of the bank 6_4=“0”

<NUMBER 2> the bank offset signal BO of the bank 6_1

=the bank offset signal BO of the bank 6_4, “0”,

+the accumulated value of the element enable signal EE of the bank 6_4, “1”

=“1”

<NUMBER 3>

The bank offset signal BO of the bank 6_2

=the bank offset signal BO of the bank 6_1, “1”

+the accumulated value of the element enable signal EE the bank 6_1, “2”

=“3”

<NUMBER 4>

The bank offset signal BO of the bank 6_3

=the bank offset signal BO of the bank 6_2, “3”

+the accumulated value of the element enable signal EE of the bank 6_2, “3”

=“6”

In FIG. 8C, the element offset signal EOs, the order signal S6*s*, and the position signal S4*s* generated by the order/position signal generating unit 32 for the banks 6_1 through 6_4 are depicted.

The element offset signal EO indicates the order of the computation data elements to be selected of each of the data element sequences R1 through R4. The value of the element offset signal EO is obtained by accumulating the value of the element enable signal EE of each of the banks 6_1 through 6_4 in the address order. An example is described below.

<BANK 6_1> the element offset signal EO of the computation data element “B”

=the element enable signal EE of the computation data element “B”, “1”

the element offset signal EO of the computation data element “C”

=the element offset signal EO of the computation data element “B”, “1”

+the element enable signal EE of the computation data element “C”, “1”

=“2”

<BANK 6_2> the element offset signal EO of the computation data element “D”

=the element enable signal EE of the computation data element “D”, “1”

the element offset signal EO of the computation data element “E”

=the element offset signal EO of the computation data element “D”, “1”

+the element enable signal EE of the computation data element “E”, “1”

=“2”

the element offset signal EO of the computation data element “F”

=the element offset signal EO of the computation data element “E”, “2”

+the element enable signal EE of the computation data element “F”, “1”

=“3”

<BANK 6_3> the element offset signal EO of the computation data element “G”

=the element enable signal EE of the computation data element “G”, “1”

the element offset signal EO of the computation data element “H”

=the element offset signal EO of the computation data element “G”, “1”

+the element enable signal EE of the computation data element “H”, “1”

=“2”

<BANK 6_4> the element offset signal EO of the computation data element “A”

=the element enable signal EE of the computation data element “A”, “1”

Next, the order signal S6*s* indicate the storing positions of the computation data elements at the vector register 8. The value of the order signal S6 is obtained as the sum of the value of the bank offset signal BO of the bank, which the computation data elements corresponds to, and the value of the element offset signal EO of the computation data element. An example is described below.

<BANK 6_1> the order signal S6 of the computation data element “B”

=the bank offset signal BO of the bank 6_1, “1”

+the element offset signal EO of the computation data element “B”, “1”

=“2”

the order signal S6 of the computation data element “C”

=the bank offset signal BO of the bank 6_1, “1”

+the element offset signal EO of the computation data element “C”, “2”

=“3”

<BANK 6_2> the order signal S6 of the computation data element “D”

=the bank offset signal BO of the bank 6_2, “3”

+the element offset signal EO of the computation data element “D”, “1”

=“4”

the order signal S6 of the computation data element “E”

=the bank offset signal BO of the bank 6_2, “3”

+the element offset signal EO of the computation data element “E”, “2”

=“5”

the order signal S6 of the computation data element “F”

=the bank offset signal BO of the bank 6_2, “3”

+the element offset signal EO of the computation data element “D”, “3”

=“6”

<BANK 6_3> the order signal S6 of the computation data element “G”

=the bank offset signal BO of the bank 6_3, “6”

+the element offset signal EO of the computation data element “D”, “1”

=“7”

the order signal S6 of the computation data element “H”

=the bank offset signal BO of the bank 6_2, “6”

+the element offset signal EO of the computation data element “E”, “2”

=“8”

<BANK 6_4> the order signal S6 of the computation data element “A”

=the bank offset signal BO of the bank 6_3, “0”

+the element offset signal EO of the computation data element “D”, “1”

=“1”

Here, with the computation data elements, “A”, “B”, “C”, “D”, “E”, “F”, “G”, and “H”, the storing order numbers of the vector register 8, such as “1”, “2”, “3”, “4”, “5”, “6”, “7”, and “8”, are each associated.

The position signal S4 indicates the positions of the computation data elements “A” through “H” among 32 data elements included in the data element sequences R1 through R4. For example, 32 data elements are assumed to be put in the address order such as the data element sequence R1, R2, R3, and R4, and are provided ascendant orders from “0” through “31”. And, to the computation data elements “A” through “H” to which the order signal S6*s* are assigned, any of the corresponding position signal S4*s* from “1” through “32” is assigned. An example of the assignment is as follows.

<Data Element Sequence R1> the computation data element “B”: the order signal “2”, the position signal “0”.

the computation data element “C”: the order signal “3”, the position signal “1”

<Data Element Sequence R2> the computation data element “D”: the order signal “4”, the position signal “9”

the computation data element “E”: the order signal “5”, the position signal “10”

the computation data element “F”: the order signal “6”, the position signal “11”

<Data Element Sequence R3> the computation data element “G”: the order signal “7”, the position signal “19”

the computation data element “H”: the order signal “8”, the position signal “20”

<Data Element Sequence R4> the computation data element “A”: the order signal “1”, the position signal “31”

Here, with the computation data elements “A”, “B”, “C”, “D”, “E”, “F”, “G”, and “H”, storing order numbers of the vector register 8, such as “1”, “2”, “3”, “4”, “5”, “6”, “7”, and “8”, and positions at the data elements R1, R2, R3, and R4 are each associated.

Next, with reference to FIG. 7 and FIG. 8, the operation of the selector unit 34 is explained. The selector unit 34 selects the computation data elements from the data element sequences R1 through R4 according to the position signal S4*s*, and stores the selected data elements into the vector register 8 in the storing order indicated by the order signal S6*s*. An example is described as below. The selectors 34_1 through 34_8 each correspond to the storing order “1” through “8” of the storing positions of the vector register 8. And, to each of the selectors 34_1 through 34_8, 32 data elements of the data element sequences R1 through R4 are input. Then, selectors 34_1 through 34_8 each select the computation data elements from 32 data elements to be stored at a storing position to which each selector corresponds to, according to the position signal S4*s* and the order signal S6*s*, and store the selected computation data elements into the vector register 8. For example, the storing order to which the selectors 34_1 through 34_8 corresponds to, the association of the value of the order signal S6, the value of the position signal S4, and the data elements to be stored are associated with one another as described in the following.

the selector 34_1: the storing order “1”, the order signal “1”, the position signal “31”, the computation data element “A”

the selector 34_2: the storing order “2”, the order signal “2”, the position signal “0”, the computation data element “B”

the selector 34_3: the storing order “3”, the order signal “3”, the position signal “1”, the computation data element “C”

the selector 34_4: the storing order “4”, the order signal “4”, the position signal “9”, the computation data element “D”

the selector 34_5: the storing order “5”, the order signal “5”, the position signal “10”, the computation data element “E”

the selector 34_6: the storing order “6”, the order signal “6”, the position signal “11”, the computation data element “F”

the selector 34_7: the storing order “7”, the order signal “7”, the position signal “19”, the computation data element “G”

the selector 34_8: the storing order “8”, the order signal “8”, the position signal “20”, the computation data element “H”

As such, the computation data elements “A” through “H” are selected from the data element sequences R1 through R4 read out from the banks 6_1 through 6_4. Then, as depicted in FIG. 8D, the computation data elements “A” through “H” are stored in the vector register 8 according to the storing order.

According to the present embodiment, from the banks 6_1 through 6_4, the data element sequences R1 through R4 including 32 data elements are read by one access. Accordingly, the latency is suppressed. On the other hand, in the above described manner, 8 computation data elements to be stored in the vector register 8 are selected from 32 data elements of the data element sequences R1 through R4, and stored in the vector register in the processing order. Accordingly, at the computation pipelines 12_3 and 12_4, the data elements are processed consecutively, therefore, a preferable throughput is obtained.

Additionally, the order/position signal generating unit 32 transfers the bank enable signal BEs, which are sent from the address generating unit 30, to the selector unit 34. Thereby, when the data element sequence is read out from the bank to which the bank enable signal BE is generated, the selector unit 34 selects the computation data elements from the data element sequences which are read. On the other hand, the data element sequence is not read out from the bank to which the bank enable signal BE is not generated, and the operation to select the computation data elements from the data element sequences is not performed.

Figures 9A, 9B, 9C, 9D:
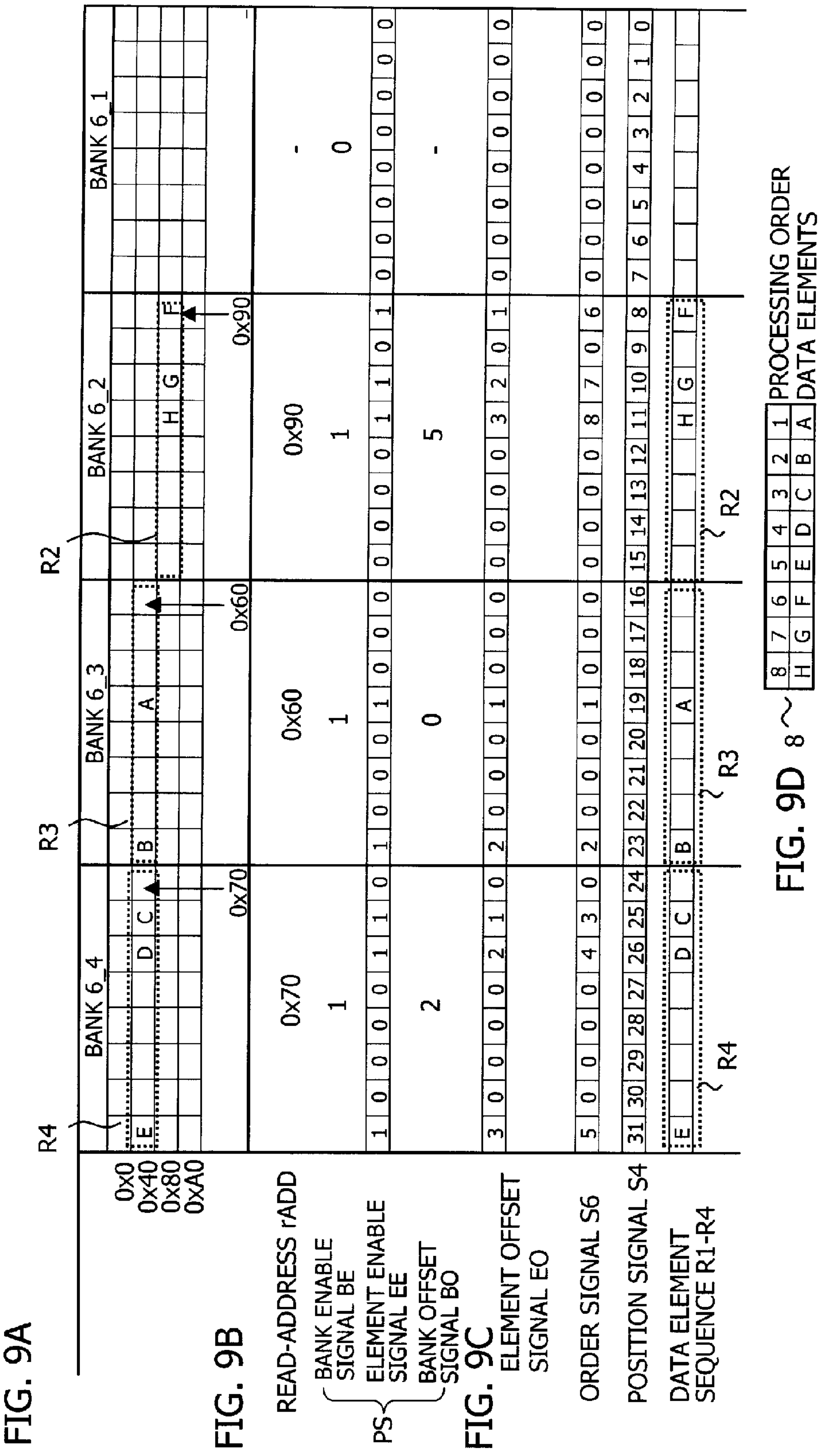
FIGS. 9A through 9D are drawings for depicting an example such that a bank enable signal is not generated.

In FIG. 9, an example is depicted such that the bank enable signal BE indicating the validity of the read-address is not generated. In FIGS. 9A through 9C, various kinds of signals depicted in FIG. 8A through 8C are depicted.

In this example, as depicted in FIG. 9A, 8 computation data elements “A” through “H” are stored in scattered manner in the banks 6_2 through 6_4. This example is described in the address order. In the bank 6_3, the data element sequence R3 including the computation data elements “A” and “B” is stored at the address “0x60”. Also, in the bank 6_4, the data element sequence R4 including the computation data elements “C”, “D” and “E” is stored at the address “0x70”. Also, in the bank 6_2, the data element sequence R2 including the computation data elements “F”, “G”, and “H” is stored at the address “0x90”. Here, in the bank 6_1, the computation data elements are not stored.

Accordingly, as depicted in FIG. 9B, for the bank 6_3, the read-address "0x60" is generated by the address generating unit 30. Also, for the bank 6_4, the read-address "0x70" is generated. Also, for the bank 6_2, the read-address "0x90" is generated. And, for the bank 6_1, a read-address is not generated. Accordingly, the data element sequences R2 through R4 are read out from the banks 6_2 through 6_4, and the data element sequence R1 is not read out from the bank 6_1.

Here, the bank enable signal BEs of the banks 6_2 through 6_4, for which the read-address rADDs are generated, have value "1"s indicating the validity. On the other hand, the bank enable signal BE of the bank 6_1, for which the read-address rADD is not generated, has a value "0" indicating invalidity. That is, the bank enable signal BE for indicating the validity of the read-address rADD is not generated. Such the bank enable signal BE are transferred, and thereby the selector unit 34 operates as follows. Further, the element enable signal EEs, and the bank offset signal BOs in FIG. 9B are obtained in the same manner as described in FIG. 8, and the element offset signal EO, the order signal S6, and the position signal S4*s* in FIG. 9C are obtained in the same manner as described in FIG. 8C.

Each of the selectors 34_1 through 34_8 of the selector unit 34, when 24 data elements of the data element sequences R2 through R4 are input, performs a process to select the data elements to the data element sequence R2 through 3 corresponding to the banks 6_2 through 6_4 for which the bank enable signal BEs are generated. On the other hand, since the data element sequence R1 of the bank 6_1, for which the bank enable signal BE is not generated, is not input thereto, the selectors 34_1 through 34_8 of the selector unit 34 do not perform a processes, which were supposed to be performed to the data element sequence R1, to select the computation data element. Thereby, waste of electric power and the processing load are reduced.

As a result of the above process, as described in FIG. 9D, the computation data elements "A" through "H" are stored into the vector register 8 in the storing order.

<Example of the Computation Data Elements being Read Out from the Vector Register 8 and Written into the Data Memory 6>

Figure 10:
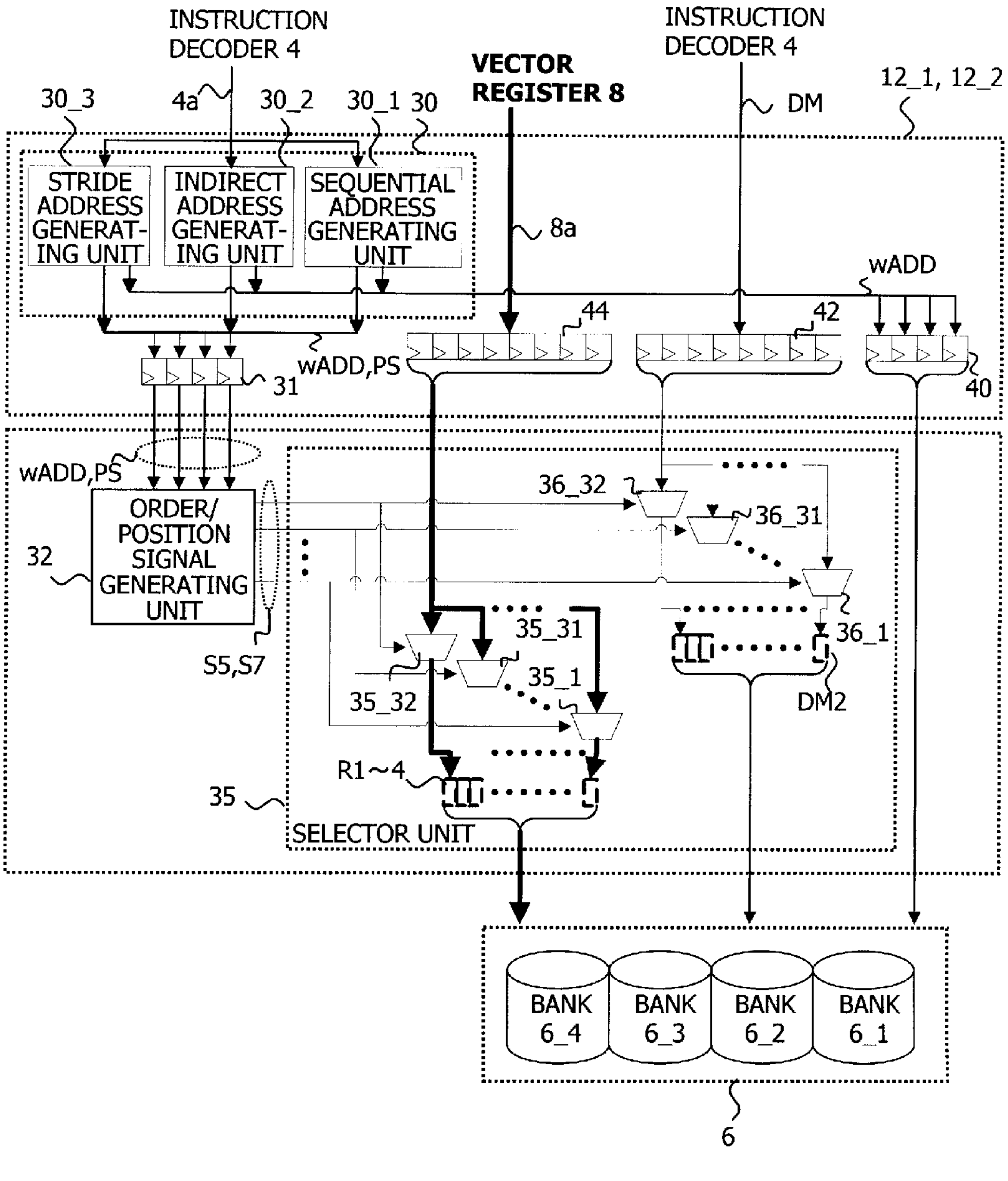
FIG. 10 is a drawing for depicting a configuration of a memory controller.

FIG. 10 is a drawing for depicting the configuration of the memory controller for reading a computation data elements from the vector register 8 and writing the computation data elements into the data memory 6. The memory controller has an address generating unit 30 which generates write-address wADDs for the banks 6_1 through 6_4 for writing the data element sequences R1 through R4. The address generating unit 30 is a module, for example, within the load/store pipelines 12_1 and 12_2. The address generating unit 30 generates the write-address wADDs on the basis of the address generating data 4*a* input from the instruction decoder 4. The address generating unit 30 has, for example, the sequential address generating unit 30_1 which generates write-address wADDs for the sequential access, the indirect address generating unit 30_2 which generates write-address wADDs for the indirect access, and the stride address generating unit 30_3 which generates the write-address wADDs for the stride access. The write-address wADDs for the banks 6_1 through 6_4 generated by the address generating unit 30 are, for example, after being stored in the register 40, input into each of the banks 6_1 through 6_4 of the data memory 6. On the other hand, at the address generating unit 30, for example, various kinds of processing signals PS are generated by the sequential address generating unit 30_1, the indirect address generating unit 30_2, and the stride address generating unit 30_3. Then, the write-address wADDs and various kinds of processing signals PS for the banks 6_1 through 6_4 are stored in the register 31.

The memory controller has an order/position signal generating unit 32 which generates order signal S5 indicating the storing order of the computation data elements at the vector register 8, where the computation data elements are stored in a processing order of the computation pipelines 12_3 and 12_4 so as to be written into the data memory 6, and generates position signal S7 indicating positions to insert the data elements, which are to be written into, at the data element sequences R1 through R4 to be written into the banks 6_1 through 6_4. The order/position signal generating unit 32 is, for example, a module within the multiplexer 14. The order/position signal generating unit 32 reads the write-address wADDs and various kinds of processing signals PS stored in the register 31, and generates, on the basis thereof, the position signal S7 and the order signal S5. The detail will be described below.

Also, the memory controller has a selector unit 35 which inserts the data elements in an order indicated by the order signal S5*s* into positions of the data element sequences R1 through R4 to be written into the banks 6_1 through 6_4, where the positions are indicated by the position signal S7*s*. The selector unit 35 is, for example, included within the multiplexer 14. The selector unit 35 has, for example, selectors 35_1 through 35_32, each corresponding to 32 data elements included in the data element sequences R1 through R4. To each of the selectors 35_1 through 35_32, 8 computation data elements 8*a* read out from the vector register 8 are input. The computation data elements 8*a* are, for example, stored in the register 44, then input into the selectors 35_1 through 35_32. Then, the selectors 35_1 through 35_32 each select the computation data elements to be inserted into a position which each selector corresponds to from among 8 computation data elements 8*a* according to the position signal S7*s* and the order signal S5*s*, and inserts the selected computation data elements into the data element sequences R1 through R4.

Further, for example, a data mask signal DM is input from the instruction decoder 4 to the selector unit 35. The data mask signal DM indicates enablement/disablement of writing the computation data elements into the data memory 6. The data mask signal DM is, for example, an 8-bit signal. Each bit indicates the enablement/disablement of writing the 8 data elements 8*a*. The data mask signal DM is, for example, stored in the register 42 and then input into the selector unit 35.

The selector unit 35 generates, according to the data mask signal DM, a 32-bit data mask signal DM2. The data mask signal DM2 commands the banks 6_1 through 6_4 enablement/disablement of writing the data element sequences R1 through R4. Each bit corresponds to each of the 32 data elements included in the data element sequences R1 through R4. The selector unit 35 has 32 units of selectors 36_1 through 36_32 generating the data mask signal DM2. The selectors 36_1 through 36_32 each correspond to each of the 32 data elements included in the data element sequences R1 through R4. To each of the selectors 36_1 through 36_32, 8-bit data mask signal DM is input. Then, each of the selectors 36_1 through 36_32 generates, according to the position signal S7*s* and the order signal S5*s*, a value ("1" or "0") indicating the enablement/disablement of insertion of the data elements to a position which each selector corresponds. Thereby, the 8-bit data mask signal DM2 is generated. The data mask signal DM2 is input into the banks 6_1 through 6_4.

At the banks 6_1 through 6_4 of the data memory 6, the data element sequences R1 through R4 are written into the write-address wADDs. At that time, the data elements enabled by the data mask signal DM2 are written. By using the data mask signal DM2, damage to the data and inconsistency of the data at the data memory 6 are avoided.

Figures 11A, 11B, 11C, 11D, 11E:
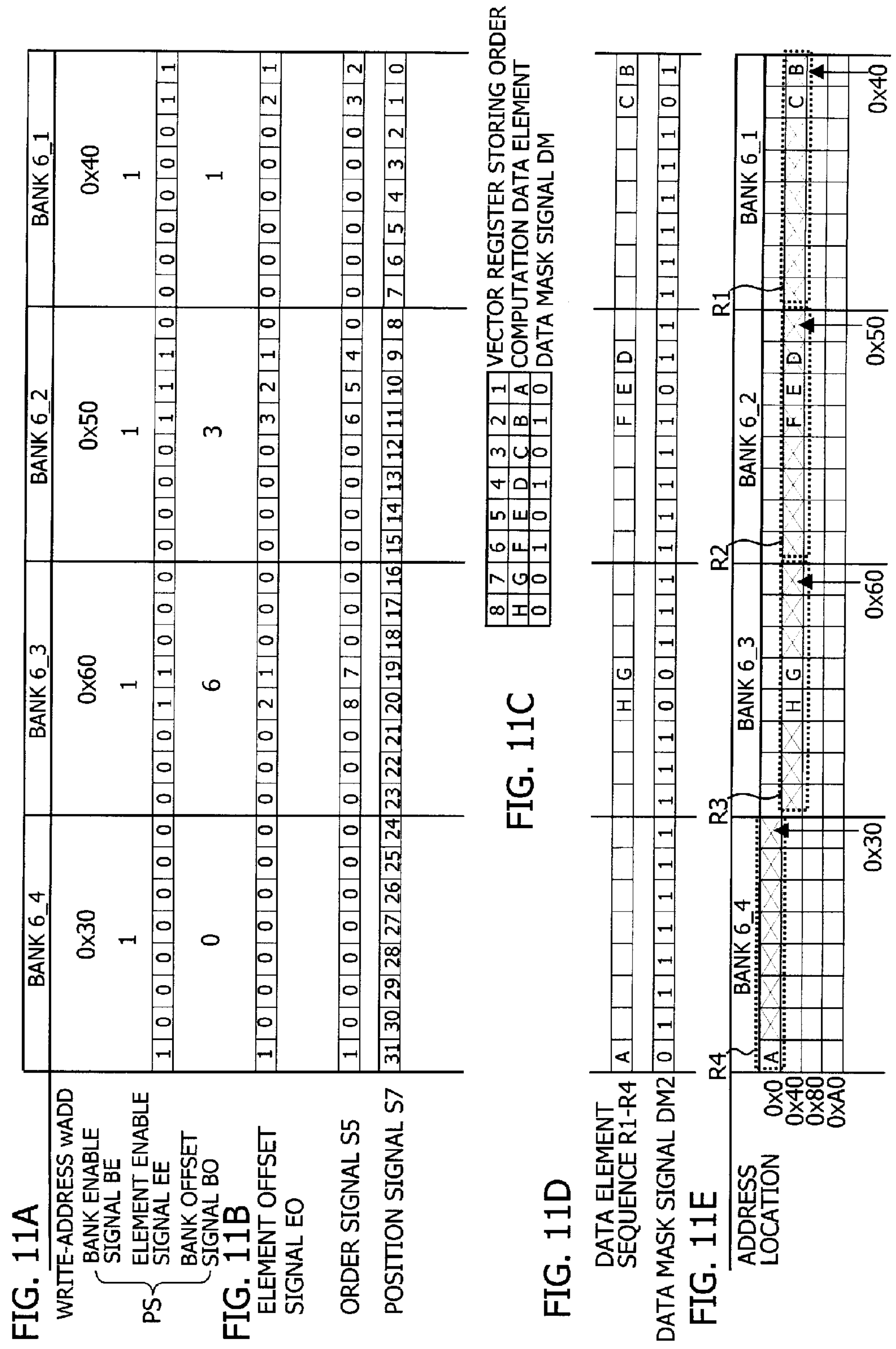
FIGS. 11A through 11E are drawings for depicting operations of an order/position signal generating unit.

FIG. 11 is a drawing for depicting detailed operations of the order/position signal generating unit 32. In FIG. 11A, the write-address wADDs generated by the address generating unit 30 for each of the banks 6_1 through 6_4 are depicted. For example, for the bank 6_1, the write-address “0x40” is generated. Also, for the bank 6_2, the write-address “0x50” is generated. Also, for the bank 6_3, the write-address “0x60” is generated. Then, for the bank 6_4, the write-address “0x30” is generated.

The above write-address wADDs are for writing the data element sequences R1 through R4 into the banks 6_1 through 6_4 as depicted in FIG. 11E. 8 computation data elements “A”, “B”, “C”, “D”, “E”, “F”, “G”, and “H” are included in the data element sequences R1 through R4. Here, the address ascends along the directions from the right to left, and from the top to bottom of the drawing. The address order of the computation data elements “A” through “H” written into the banks 6_1 through 6_4 corresponds to the storing order at the vector register 8, or the processing order by the computation pipelines 12_3 and 12_4.

Also, in FIG. 11A, various kinds of processing signals PS generated by the address generating unit 30 are depicted. The various kinds of processing signals PS include the bank enable signal BEs, the element enable signal EEs, and the bank offset signal BOs.

The bank enable signal BEs, the element enable signal EEs, and the bank offset signal BOs are generated according to the write-address wADD.

The bank enable signal BE indicates the validity of the write-address wADD at each of the banks 6_1 through 6_4. The bank enable signal BE is, for example, a 1-bit signal. When the write-address wADD is generated, the bank enable signal BE has the value “1” indicating the validity. On the other hand, when the write-address rADD is not generated, the bank enable signal BE has the value “0”. Here, at all the banks 6_1 through 6_4, the write-address wADDs are generated. Accordingly, for all the banks 6_1 through 6_4, the bank enable signal BE, having the value “1” indicating the validity of the write-address wADD, is generated The element enable signal EE indicates positions to insert the computation data elements at each of the data element sequence R1 through R4. For example, as depicted in FIG. 11D, the computation data elements “B” and “C” are respectively inserted into the first and the second columns of the data element sequence R1. Accordingly, the value of the element enable signal EE is, from the first to the eighth column, “1, 1, 0, 0, 0, 0, 0, 0”. Also, to the data element sequence R2, the computation data elements “D”, “E”, and “F” are inserted at the second to the fourth columns. Accordingly, the value of the element enable signal EE corresponding to the data element sequence R2 is, from the first to eighth columns, “0, 1, 1, 1, 0, 0, 0, 0”. Also, to the data element sequence R3, the computation data elements “G” and “H” are inserted at the fourth and the fifth columns. Accordingly, the value of the element enable signal corresponding to the data element sequence R3 is, from the first to eighth columns, “0, 0, 0, 1, 1, 0, 0, 0”. Then, computation data element “A” is inserted into the eighth column of the data element sequence R4. Accordingly, the value of the element enable signal EE corresponding to the data element sequence R4 is, from the first to eighth columns, “0, 0, 0, 0, 0, 0, 0, 1”.

The bank offset signal BO indicates the order of each of the banks 6_1 through 6_4, corresponding to the order of the computation data elements to be inserted into the data element sequences R1 through R4. The value of the bank offset signal BO is obtained from the accumulated value of the order of the read-address wADD of each of the banks 6_1 through 6_4, and the element enable signal EE. An example is as depicted as in FIG. 8B.

In FIG. 11B, the element offset signal EO, the order signal S5, and the position signal S7 for each of the banks 6_1 through 6_4, generated by the order/position signal generating unit 32, are depicted. The element offset signal EO indicates the order of the computation data elements to be inserted into each of the data element sequences R1 through R4. The value of the element offset signal EO is obtained by accumulating the value of the element enable signal EE in order of the address at each of the banks 6_1 through 6_4. An example is as depicted in FIG. 8C.

The order signal S5 indicates the storing position of the computation data elements at the vector register 8. Correspondence relations between the storing order “1” through “8” and the computation data elements “A” through “H” at the vector register 8 are depicted in FIG. 11C. Also, in FIG. 11C, the data mask signal DM, which defines enablement/disablement of writing of each of the computation data element, is depicted. The value of the order signal S5 is obtained as a sum of the value of the bank offset signal BO for the bank to which the computation data element corresponds, and the value of the element offset signal EO of the computation data element. An example is as depicted in FIG. 8C.

Here, to the computation data elements “A”, “B”, “C”, “D”, “E”, “F”, “G”, and “H”, the order “1”, “2”, “3”, “4”, “5”, “6”, “7”, and “8” for storing in the vector register 8 are associated.

The position signal S7*s* indicate positions of the computation data elements “A” through “H” to be inserted, at 32 data elements of the data element sequence R1 through R4. For example, 32 data elements are arranged in the address order such as the data element sequence R1, R2, R3, and R4, and the values from “0” through “31” are assigned thereto in ascending order. Then, to each of the computation data elements “A” through “H”, to which the order signal S5 is assigned, any of the corresponding position signals “1” through “32” is assigned. An example is described as follows.

<Data Element Sequence R1> the computation data element “B” to be inserted: the order signal “2”, and the position signal “0”

the computation data element “C” to be inserted: the order signal “3”, and the position signal “1”

<Data Element Sequence R2> the computation data element “D” to be inserted: the order signal “4”, and the position signal “9”

the computation data element “E” to be inserted: the order signal “5”, and the position signal “10”

the computation data element “F” to be inserted: the order signal “6”, and the position signal “11”

<Data Element Sequence R3> the computation data element “G” to be inserted: the order signal “7”, the position signal “19”

the computation data element “H” to be inserted: the order signal “8”, and the position signal “20”

<Data Element Sequence R4> the computation data element “A” to be inserted: the order signal “1”, and the position signal “31”

Here, the computation data elements “A”, “B”, “C”, “D”, “E”, “F”, “G”, and “H”, the order for storing in the vector register 8, such as “1”, “2”, “3”, “4”, “5”, “6”, “7”, and “8”, and the insertion position at the data elements R1, R2, R3, and R4 are associated with one another.

Below, with reference to FIG. 10 and FIG. 11, operations of the selector unit 35 will be explained. The selector unit 35 inserts the data elements into positions, which the position signal S7s indicate, at the data element sequences R1 through R4 to be written into the plurality of the banks 6_1 through 6_4 in an order which the order signal S5s indicate. An example is as described below.

Each of the selectors 35_1 through 35_32 corresponds to the positions "0" through "31" of 32 data elements at the data element sequences R1 through R4. To the selectors 35_1 through 35_32, 8 computation data elements 8a read out from the vector register 8, that is "A" through "H", are input. Then, the selectors 35_1 through 35_32 select the computation data elements to insert into a position, which each of the selectors corresponds to, from among 8 computation data elements 8a according to the position signal S7s and the order signal S5s, and insert the selected computation data elements into the data element sequences R1 through R4. For example, among the selectors 35_1 through 35_32, the correspondence relations of the value of the order signal S5s to insert the computation data elements "A" through "H", the values of the position signal S7s, and the data elements to be inserted are as follows.

<Selector 35_2> the order signal "2"—the position signal "0"—the computation data element "B"

<Selector 35_3> the order signal "3"—the position signal "1"—the computation data element "C"

<Selector 35_9> the order signal "4"—the position signal "9"—the computation data element "D"

<Selector 35_10> the order signal "5"—the position signal "10"—the computation data element "E"

<Selector 35_11> the order signal "6"—the position signal "11"—the computation data element "F"

<Selector 35_19> the order signal "7"—the position signal "19"—the computation data element "G"

<Selector 35_20> the order signal "8"—the position signal "20"—the computation data element "H"

<Selector 35_31> the order signal "1"—the position signal "31"—the computation data element "A"

Also, other selectors than the above such as the selector 35_1, 35_4 through 8, 35_12 through 35_18, and 35_21 through 35_30, corresponding to the order signal "0"s, and not corresponding to the computation data elements to be inserted, do not perform the insertion. As above, the computation data elements "A" through "H" read out from the vector register 8 are inserted into the data element sequences R1 through R4.

In FIG. 11D, the data sequences R1 through R4 with the computation data elements "A" through "H" inserted thereto are depicted. Also, in FIG. 11D, the data mask signal DM2 generated from the data mask signal DM of FIG. 11C is depicted. The data mask signal DM2 is a 32-bit signal. The bit value corresponding to the data element enabled for writing is "0", and the bit value corresponding to the data element disabled for writing is "1". Here, an example is depicted such that the writing of the data element "B", "D", and "F" are disabled.

As above, the data element sequences R1 through R4 which are inserted with the computation data elements "A" through "H" are, as depicted in FIG. 11E, written into the banks 6_1 through 6_4 by a single access. Accordingly, the latency is reduced. Also, at that time, by enabling/disabling the writing of the element data, data at the data memory 6 are protected. Further, in FIG. 11E, "X"s are marked at the computation data elements which are disabled for writing. Also, on the other hand, the computation pipelines 12_3 and 12_4 consecutively process the data elements and output the computation results, thus the pipeline stall is reduced. Accordingly, a preferable throughput is obtained.

Additionally, the order/position signal generating unit 32 transfers to the selector unit 35 the bank enable signal BE sent from the address generating unit 30. The selector unit 35 inserts the computation data elements into the data element sequence to be written into the bank for which the bank enable signal BE is generated. On the other hand, the selector unit 35 does not insert the computation data elements into the bank for which the bank enable signal BE is not generated, since the data element sequence is not written thereinto.

Figures 12A, 12B, 12C, 12D, 12E:
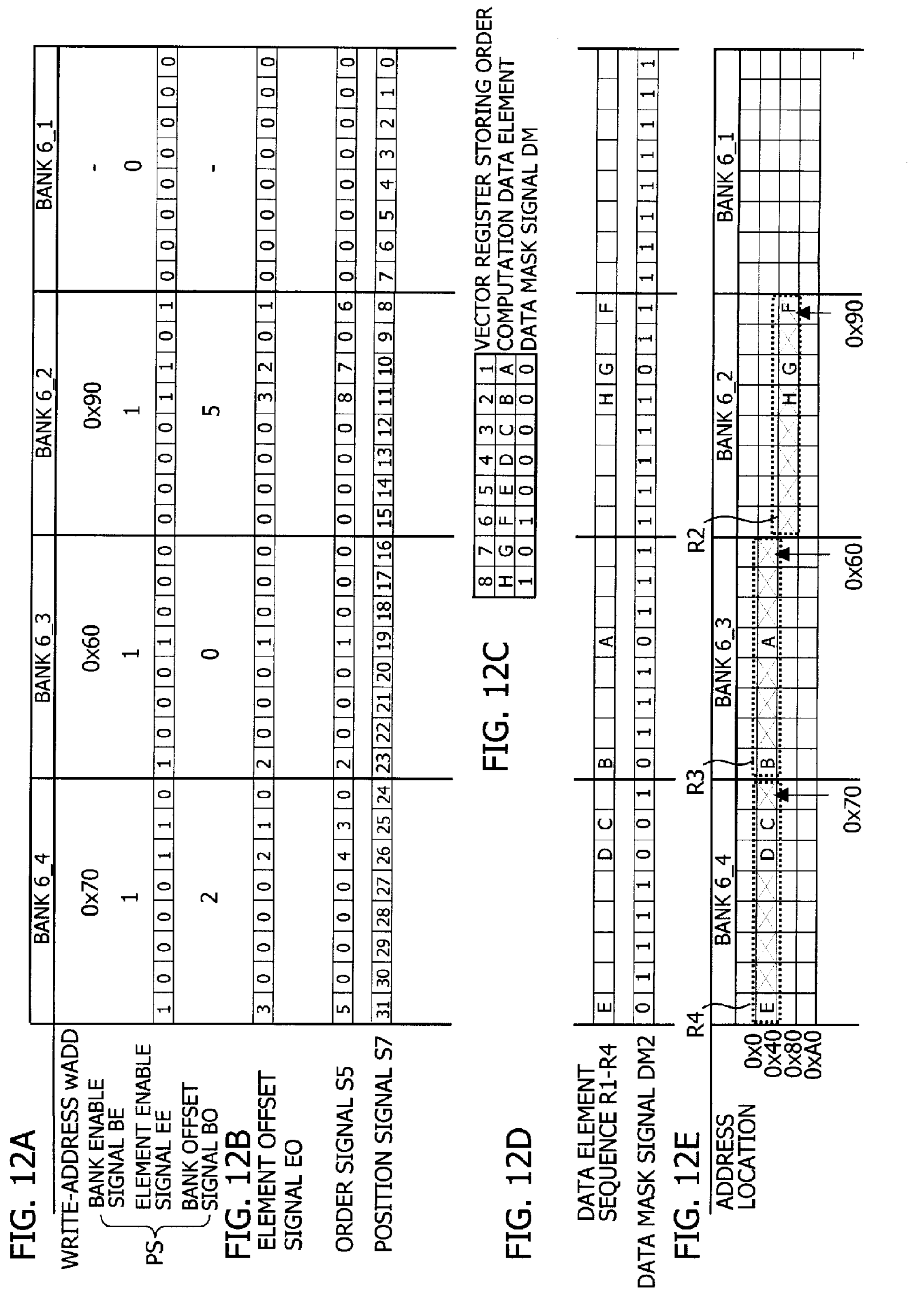
FIGS. 12A through 12E are drawings for depicting an example such that a bank enable signal is not generated.

In FIG. 12, an example is described such that the bank enable signal BE indicating the validity of the write-address is not generated. In FIG. 12A through 12E, various kinds of signals depicted in FIG. 11A through 11E are depicted.

In this example, as depicted in FIG. 12E, 8 computation data elements "A" through "H" are written in scattered manner into the bank 6_2 through 6_4. For example, as depicted in the address order, the data element sequence R3 including the computation data elements "A" and "B" are written into the bank 6_3 at the address "0x60". Also, into the bank 6_4, the data element sequence R4 including the computation data elements "C", "D", and "E" are written at the address "0x70". Also, into the bank 6_2, the data element sequence R2 including the computation data elements "F", "G", and "H" are written at the address "0x90". Then, into the bank 6_1, no data elements is written.

Accordingly, as depicted in FIG. 12A, by the address generating unit 30, the write-addresses "0x90", "0x60", and "0x70" are generated respectively for the bank 6_2, 6_3, and 6_4. Then, for the bank 6_1, no write-address is generated. Accordingly, the bank enable signal BEs for any of the bank 6_2 through 6_4, for which the write-address wADD is generated, have the value "1"s indicating the validity. On the other hand, however, the bank enable signal BE for the bank 6_1, for which no write-address wADD is generated, has the value "0" indicating the invalidity. That is, no bank enable signal BE for indicating the validity of the write-address wADD is generated.

By such the bank enable signal BE being transferred, the selector unit 35 operates as described below. Further, the element enable signal EEs, and the bank offset signal BOs in FIG. 12A are obtained in the same manner as described in FIG. 11A, and the element offset signal EOs, the order signal S5s, and the position signal S7s of FIG. 12B are obtained in the same manner as described in FIG. 11B.

The selectors 35_1 through 35_32 of the selector unit 35 insert the element data, when 8 computation data elements "A" through "H" are input thereto, into the data element sequence R2 through 3 corresponding to the bank 6_2 through 6_4 where the bank enable signal BEs are generated, according to the order signal S5s and the position signal S7s depicted in FIG. 12B. On the other hand, however, the selector 35_1 through 32 does not insert the data elements into the data element sequence R1 corresponding to the bank 6_1, for which the bank enable signal BE is not generated. Thereby, waste of electrical power and process load are reduced.

As a result of the above, the computation data elements stored in the vector register 8, as depicted in FIG. 12C, are written into each bank of the data memory 6, as depicted in FIG. 12E. Also, at that time, writing the computation data elements is enabled/disabled by the data mask signal DM depicted in FIG. 12C.

The vector processor 1 as described above is, for example, applied to a signal processor installed in a mobile communication device, and processing FFT (Fast Fourier Transforms) or the like with base band signal as the element data. Alternatively, for example, application is also possible to an image processing apparatus for image processing with pixel data as the element data. According to the present embodiment, in reading/writing the data elements in the data memory by accessing discontinuous address thereof, a preferable throughput is obtained even by a minimum circuit configuration.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments have been described in detail, it should be understood that the various changes, substitutions, and alterations could be made hereto without departing from the spirit and scope of the invention.

What is claimed is:

1. A memory controller comprising:

a first generating unit that generates a read-address to read a data element sequence having a plurality of data elements from a bank of a memory, the memory having a plurality of the banks, from each of which the data element sequence is read out in response to an input of the read-address;

a second generating unit that generates a position signal indicating a position of a data element to be selected from the data element sequence, and an order signal indicating a storing order for storing the data element to be selected into a register; and a selector unit that selects, according to the position signal, the data element to be selected from the data element sequence read out from each of the plurality of the banks, and stores the selected data element in the storing order indicated by the order signal into the register, wherein the data element stored in the register is processed in the storing order by a vector processor.

2. The memory controller according to claim 1, wherein the first generating unit further generates an enable signal indicating a validity of the read-address, and the selector unit selects the data elements to be selected from the data element sequence read out from the bank for which the enable signal is generated, and does not select the data elements to be selected from the data element sequence read out from the bank for which the enable signal is not generated.

3. The memory controller according to claim 1, wherein the order of the read-address of each of the plurality of the banks corresponds to the storing order of the data elements to be selected included within the data element sequence read out at the read-address, and the second generating unit generates the order signal according to a first offset signal which is generated according to the read-address of each of the banks and indicates an order of the data element sequence read out from the plurality of the banks, and a second offset signal indicating an order of the data elements to be selected from each of the data element sequences read out from each of the plurality of the banks.

4. A memory controller comprising:

a first generating unit that generates a write-address to write a data element sequence having a plurality of data elements into a bank of a memory, the memory having a plurality of the banks, into each of which the data element sequence is written in response to an input of the write-address;

a second generating unit that generates an order signal indicating a storing order at the register of a data element to be written into the memory, the data elements begin stored in the register in a processing order of a vector processor, and generates a position signal indicating a position to insert the data element to be written into the data element sequence to be written into each of the plurality of the banks; and a selector unit that inserts the data elements into the plurality of the banks indicated by the position signal in an order indicated by the order signal, wherein the data element sequence including the data element to be written is written at the write-address of each of the banks.

5. The memory controller according to claim 4, wherein the first generating unit further generates an enable signal indicating a validity of the write-address, and the selector unit inserts the data element to be written into the data element sequence which is written into the bank for which the enable signal is generated, and does not insert the data element to be written into the data element sequence which is written into the bank for which the enable signal is not generated.

6. The memory controller according to claim 4, wherein the selector unit inserts, according to a mask signal indicating enablement/disablement of writing of the data element, the data element enabled to be written into the data element sequence to be written into the plurality of the banks, and does not insert the data element disabled for writing into the data element sequence to be written into the plurality of the banks.

7. The memory controller according to claim 4, wherein an order of the write-address of each of the banks corresponds to the storing order of the data element included within the data element sequence to be written into the write-address, and the second generating unit generates a first offset signal indicating an order of the data element sequence written into the plurality of the banks, which is generated on the basis of the write-address of each of the banks, and a second offset signal indicating an order of the data elements to be written for each of the data element sequence to be written into each of the plurality of the banks.

8. A memory controlling method comprising:

generating a read-address to read a data element sequence having a plurality of data elements from a bank of a memory, the memory having a plurality of the banks, from each of which the data element sequence is read out in response to an input of the read-address;

generating a position signal indicating a position of the data element to be selected from the data element sequence;

generating an order signal indicating a storing order for storing the data elements to be selected into a register;

selecting, according to the position signal, the data element to be selected from the data element sequence read out from each of the plurality of the banks; and storing the selected data element in a storing order indicated by the order signal into the register, wherein the data element stored in the register is processed in the storing order by the vector processor.

9. A memory controlling method comprising:

generating a write-address to write a data element sequence having a plurality of data elements into a bank of a memory, the memory having a plurality of the banks, into each of which the data element sequence is written in response to an input of the write-address;

generating an order signal indicating a storing order at the register of the data elements to be written into the memory, the data elements begin stored in the register in a processing order of the vector processor;

generating a position signal indicating a position to insert the data elements into the data element sequence to be written into each of the plurality of the banks; and inserting the data element into the plurality of the bank indicated by the position signal in an order indicated by the order signal, wherein the data element sequence including the data element to be written is written at the write-address of each of the banks.

* * * * *